(12) United States Patent
Dimov et al.

(10) Patent No.: US 12,138,554 B2
(45) Date of Patent: Nov. 12, 2024

(54) DETECTING META-ENVIRONMENT CHANGES

(71) Applicant: INTERNATIONAL BUSINESS MACHINES CORPORATION, Armonk, NY (US)

(72) Inventors: Vassil Radkov Dimov, Stuttgart (DE); Tobias Kevin Franzel, Tuebingen (DE); Basem Elasioty, Regensburg (DE); Cornelius Wiehl, Tuebingen (DE); Kareem Amin, Freising (DE); Stephane Rodet, Stuttgart (DE); Aaron K. Baughman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 17/456,456

(22) Filed: Nov. 24, 2021

(65) Prior Publication Data
US 2023/0277946 A1 Sep. 7, 2023

(51) Int. Cl.
*A63F 13/798* (2014.01)
*A63F 13/795* (2014.01)

(52) U.S. Cl.
CPC .......... *A63F 13/798* (2014.09); *A63F 13/795* (2014.09); *A63F 2300/5566* (2013.01); *A63F 2300/558* (2013.01)

(58) Field of Classification Search
CPC .................................................. A63F 13/798
See application file for complete search history.

(56) References Cited

U.S. PATENT DOCUMENTS

| 8,230,343 | B2 | 7/2012 | Logan |
| 9,015,093 | B1 | 4/2015 | Commons |

(Continued)

FOREIGN PATENT DOCUMENTS

| CN | 12272581 A | 1/2021 |
| CN | 113058253 A | 7/2021 |

OTHER PUBLICATIONS

Chuanjie YANG, Jianguo Chen, and Guofeng SU. 2016. Effective situational awareness to wildfire emergency command based on multi-model forecasting system. In Proceedings of the Second ACM SIGSPATIAL International Workshop on the Use of GIS in Emergency Management (EM-GIS '16). Association for Computing Machinery, New York, NY, USA, Article 1, 1-3. DOI:https://doi.org/10.1145/3017611.3017612.

(Continued)

*Primary Examiner* — Jay Trent Liddle
(74) *Attorney, Agent, or Firm* — Kimberly Zillig (57) ABSTRACT

A computer-implemented method for detecting a change in a meta-environment is disclosed. The method comprises collecting historic parameter values from at least one actor being active in the meta-environment, wherein each of the at least one actors has a set of abilities represented by parameters relating to the collected parameter values, collecting current parameter values from the at least one actor being active in the meta-environment, determining weight values of the collected historic parameters and weight values of the collected current parameters, and upon a value of a function of the determined weight values of the historic parameters and the weight values of the collected current parameters being greater than a predefined threshold value, determining a detection of the change in the meta-environment.

14 Claims, 7 Drawing Sheets

(56) References Cited

U.S. PATENT DOCUMENTS

| | | | |
|---|---|---|---|
| 2014/0279754 A1 | 9/2014 | Barsoum | |
| 2017/0261646 A1 | 9/2017 | Liu | |
| 2017/0270751 A1 | 9/2017 | Paradise | |
| 2017/0323216 A1 | 11/2017 | Fano | |
| 2017/0330109 A1 | 11/2017 | Maughan | |
| 2020/0012900 A1 | 1/2020 | Walters | |
| 2020/0078679 A1* | 3/2020 | Dantas de Castro | ... G06T 13/00 |
| 2020/0086218 A1 | 3/2020 | Nakano et al. | |
| 2021/0162307 A1* | 6/2021 | Araya | ............ A63F 13/847 |
| 2022/0086511 A1* | 3/2022 | Laakkonen | ........... G07F 17/326 |
| 2022/0215232 A1* | 7/2022 | Pardeshi | ................ G06N 3/047 |

OTHER PUBLICATIONS

D. Chen, Y. Liu, B. Kim, J. Xie, C. S. Hong and Z. Han, "Edge Computing Resources Reservation in Vehicular Networks: A Meta-Learning Approach," in IEEE Transactions on Vehicular Technology, vol. 69, No. 5, pp. 5634-5646, May 2020, doi: 10.1109/TVT. 2020.2983445.

D. Hernandez, C. T. Toyin Gbadamosi, J. Goodman and J. A. Walker, "Metagame Autobalancing for Competitive Multiplayer Games," 2020 IEEE Conference on Games (CoG), 2020, pp. 275-282, doi: 10.1109/CoG47356.2020.9231762.

Goutte, Cyril; Wang, Yunli; Liao, Fangming; Zanussi, Zachary; Larkin, Samuel; Grinberg, Yuri, "EuroGames 16: Evaluating Change Detection in Online Conversation," PConference Proceedings of the Eleventh International Conference on Language Resources and Evaluation (LREC 2018), May 2018, European Language Resources Association (ELRA), Miyazaki, Japan, https://aclanthology.org/L18-1277.

IBM at the 2021 US Open Advantage, fans—IBM Power Rankings and Match Insights with Watson, built on the IBM Cloud, IBM, https://www.IBM.com/sports/usopen/, Retrieved from IBM on Nov. 15, 2021.

K. Zhang, X. Feng, X. Tian, Z. Hu and N. Guo, "Partial Least Squares regression load forecasting model based on the combination of grey Verhulst and equal-dimension and new-information model," 2020 7th International Forum on Electrical Engineering and Automation (IFEEA), 2020, pp. 915-919, doi: 10.1109/ IFEEA51475.2020.00192.

Shouyong Jiang, Marcus Kaiser, Jinglei Guo, Shengxiang Yang, and Natalio Krasnogor. 2018. Less detectable environmental changes in dynamic multiobjective optimisation. In Proceedings of the Genetic and Evolutionary Computation Conference (GECCO '18). Association for Computing Machinery, New York, NY, USA, 673-680. DOI: https://doi.org/10.1145/3205455.3205521.

Syken, Noah, "Decision Support: ESPN Fantasy Football and the power of IBM Watson," https://www.ibm.com/blogs/game-changers/decision-support-espn-fantasy-football-and-the-power-of-IBM-watson/. Retrieved from internet on Dec. 15, 2021.

The Ultimate Guide to Model Retraining, MLINPRODUCTION, https://mlinproduction.com/model-retraining/.

Xiongwei Wu, Doyen Sahoo, and Steven Hoi. 2020. Meta-RCNN: Meta Learning for Few-Shot Object Detection. In Proceedings of the 28th ACM International Conference on Multimedia (MM '20). Association for Computing Machinery, New York, NY, USA, 1679-1687. DOI:https://doi.org/10.1145/3394171.3413832.

International Search Report, International Application No. PCT/ IB2022/061198, Mar. 14, 2023, 8 pgs.

\* cited by examiner

| 402 | forecasting in game data statistics (PV) forward in time to increase training data |

| 404 | ranking statistics (P) based on covariance to all other statistics |

| 406 | starting with the most independent statistics (PV), building a model for each statistic (PV) that can forecast the statistics (PV) into the future |

| 408 | using the improved models to forecast again |

| 410 | create time buckets from the forecasted data from previous steps |

| 412 | train a model for each statistic (P) in the same way as in the steps 404, 406 |

| 414 | trend the model weights forward in time to create a forecast model for each statistic (P) | to Fig. 5

DETECTING META-ENVIRONMENT CHANGES

BACKGROUND

The disclosure relates generally to a detection of a change in a meta-environment, and more specifically, to a computer-implemented method for detecting a change in a meta-environment. The disclosure relates further to a meta-environment change detection system for detecting a change in a meta-environment, and a computer program product.

Forecasting the behavior of a system at a future point in time can be extremely challenging. A system is to be understood as a multitude of active components that are dependent on one another in multiple and time-dependent ways. The forecasting or prediction of the state of the system for the future point in time may be based on the behavior and characteristics of the system at earlier points in time up to a current state.

An abstract model can be transformed into a variety of different areas of application. One may be an e-sports environment in which different characters (i.e., avatars or in-game figures) fight against each other controlled by human players. The characters may have different abilities (or skills) which may change over time. Additionally, the general ruleset underlying the e-sports game may also change. Hence, the ruleset building the contextual environment of the computer game, which may be denoted as meta-environment, may change. In such a situation, it may become very difficult to foresee (i.e., forecast/predict) which character or which gamer would win the e-sports match because the historical collected data of the game has been collected under a different ruleset or under different ability conditions of the different characters.

Furthermore, meta-environments may also relate to real sports events. Also here, a change in the ruleset defining the meta-environment may occur such that extrapolating historical experience for ongoing or future matches to forecast/predict the winning team may be difficult. For example, a change in a rule relating to basketball may occur, such as the distance of the penalty free throw shot. As a result, the ruleset underlying the game of basketball has been changed. Thus, knowing the strengths and weaknesses of the players on the various teams may no longer be the best data for forecasting/predicting the outcome of actual or future matches.

Another example of changed rules may relate to soccer. For instance, a change such as video review of a penalty or that a soccer player is required to leave the field so that one team only plays with 10 players. Thus, it is required to change the value of the collected data about players during the times before the player had to leave the field in order to an accurate assessment of the player.

A further example may be a robotic mechanism comprising a controller for forecasting movements, such as collision prediction. There may be a controller system using historical data for forecasting movements of the tool at an end of an arm of the mechanism. A new tool may be made available such that the existing tool can be demounted from the robot to allow the new tool to be mounted to the robot. Regarding collision prediction (e.g., with a worker being active in the room of motion of the robot) would no longer be reliable because the underlying ruleset may render the historic "experience data" of the controller of the robot less reliable or inaccurate.

SUMMARY

According to one aspect of the present disclosure, a computer-implemented method for detecting a change in a meta-environment is provided. The method includes collecting historic parameter values from at least one actor being active in the meta-environment, wherein the one actor has a set of abilities represented by parameters relating to the collected parameter values, collecting current parameter values from the at least one actor being active in the meta-environment, determining weight values of the collected historic parameters and weight values of the collected current parameters, and upon a value of a function of the determined weight values of the historic parameters and the weight values of the collected current parameters being larger than a predefined threshold value, determining a detection of the change in the meta-environment.

According to another aspect of the present disclosure, a meta-environment change detection system for detecting a change in a meta-environment may be provided. The system includes a processor and a memory, communicatively coupled to the processor, wherein the memory stores program code portions that, when executed, enable the processor, to collect historic parameter values from at least one actor being active in the meta-environment, wherein the one actor has a set of abilities represented by parameters relating to the collected parameter values, to collect current parameter values from the at least one actor being active in the meta-environment, to determine weight values of the collected historic parameters and weight values of the collected current parameters, and determine a detection of the change in the meta-environment if a value of a function of the determined weight values of the historic parameters and the weight values of the collected current parameters being larger than a predefined threshold value.

The proposed computer-implemented method for detecting a change in a meta-environment may offer multiple advantages, technical effects, contributions and/or improvements:

Embodiments of the disclosure enable a way to rank and reliably predict win chances of participants in an activity when conditions and rulesets of the meta-environment for that activity have recently changed. The win probability determination is no longer based on historical data that does not reflect the change in the meta-environment, but rather on data that have been "back-casted" and based on a recently changed ability or parameter. This is in contrast to forecasting, which looks into the future.

A reliable ranking of future event win probabilities can be possible because the generated historical data (i.e., "back-casted") is imputed into the collected historic data until the collected historical data has been altered to account for the change in the meta-environment. This may be achieved because past and current parameter values can be made comparable to each other even if there has been a change in the meta-environment at some point.

It should be understood, that although the described fundamental features of the method are related to video games and sports, the present disclosure is not necessarily limited to such applications, various aspects of the disclosure may be appreciated through a discussion of various examples using this context.

In some embodiments, determining a detection of the change in the meta-environment includes detecting a new parameter, wherein the new parameter can indicate a new ability of the at least one actor. Consequently, the change of the meta-environment may have additional components including a real change in the underlying mechanics, i.e., fundamental possible degrees of freedom in the meta-environment, and changed abilities of an actor in the form of one or more new parameters. For example, an actor may have game-changing new characteristics that may give him an advantage, or disadvantage, over other actors. The option can be interpreted as a detection to the change in the meta-environment. This is because the ruleset defining interdependencies between the actors, or actor, with its direct environment now adhere to a different ruleset.

In some embodiments, the meta-environment may be a game, such as a competitive video game or sporting event, wherein the collected historic and/or current parameter values are used to determine a ranking of the actors in the game. However, the fundamental principles of the proposed method may also be applicable to a real-world (in contrast to a virtual world or meta-universe or simply meta-verse), e.g., for a robot suddenly being equipped with a new tool at an end of a robotic arm. This may also change the way the robot may interact with its environment. The new tool may be a welding torch or a hypersensitive artificial hand to grab a raw egg instead of a simple gripper. The described changes to the robot may change the type of interaction with the environment, so that historically collected movement and interaction data may no longer be a reliable source for forecasting/predicting movements and interactions of the robot/tool combination in the future.

In some embodiments, a function of the weight values of the historic parameter values and the corresponding weight values of the collected current parameter values of the parameters of the at least one actor may represent a total ability of the at least one actor in the meta-environment. The function may, for example, be a norm of a vector built from the weight values of the historic parameter values and a norm of a vector built from the corresponding weight values of the collected current parameter values. This can be a representation of a total ability of an actor or a related gamer (i.e., person controlling the actor) before a change in the meta-environment and after the change. Hence, a comparison of the length of the built vectors can represent a probability that an actor winning a match. Based on the game win prediction, a ranking can be created. In cases where there is a 1:1 relationship between an actor and a gamer, the actor's (or in game terminology "character") chance to win may be determined. However, with games that have multiple matches, a gamer may change their selected character. Also, the gamer playing strength may be ranked in an additional logical dimension.

In some embodiments, determining the weight values, such as the weight values of the historic parameter values and the related weight values of the collected current parameter values, includes feeding the historic parameter values and the current parameter values and respective total ability values to a statistical analyzer system for determining the weight values. In some embodiments, determining the weight values can also include feeding the historic parameter values and the current parameter values and respective total ability values to a trained machine-learning system including a trained machine-learning model for determining the weight values as prediction values of the machine-learning system. The trained machine-learning model can be built by training the machine-learning system with historic parameter values and related total ability values, or win values, respectively.

In some embodiments, a first amount of the historical parameter values is larger than a second amount of current parameter values. This feature may come as a natural enhancement to the proposed method and as a way for the historical parameter values and current parameter values to be collected. If a change to the meta-environment happens, only one or two or a few sets of current parameter values can be collected. An archive can store a much larger number of collected historical parameter values. However, the ranking and the prediction of the system behavior and the participants should be possible, although only "a few" current parameter values are potentially available if compared to the much larger number of historical parameter values.

In some embodiments, the method includes generating first new parameter values using the current parameter values and imputing the new parameter values into the historical parameter values. The consequence of these steps is that "back-casted" parameter values reflecting the change in the meta-environment can be used in a ranking process. This new set of parameter values, enriching the collected historic parameter values, simulate a situation in which the new ability represented by a new parameter with so-to-speak simulated, synthetic or artificial historic parameter values or a change in the general rule set of the meta-environment could exist. Hence, a forecasting of the system may become possible that takes into account the new feature (i.e., new ability/parameter) of an actor or the change in the rules set of the meta-environment.

In some embodiments, generating first new parameter values using the current parameter values includes extrapolating the current parameter values into the future as first extrapolated parameter values and building a ranking of the parameters by a covariance dependency of the extrapolated parameter values. Thereby allowing the method to filter out the parameter with the least dependence on other parameters.

In some embodiments, the method includes forecasting (e.g., by extrapolating or regression techniques) second parameter values for the parameter having a lowest covariance value to other parameters using the first extrapolated parameter values. This activity can be applied to all parameters in the sequence of the ranking.

In some embodiments, the method includes building time buckets for the extrapolated first and second parameter values, training forecasting models based on extrapolating and/or regression techniques for a third parameter of the parameters having a next lowest covariance value to other parameters using the first and second extrapolated parameter values. Furthermore, in some embodiments, the trained forecasting models each have a set of variable values built during the steps of training the forecasting models. The sets of variable values are built for each of the forecasting models, wherein the sets of variable values represent statuses of the forecasting models at a later point in time.

In some embodiments, forecasting models are used to generate the new parameter values, where imputing the new parameter values includes replacing the collected historical parameter values with newly forecasted parameter values. Therefore, not any collected historical parameter values may exist in the data set used for forecasting/predicting a ranking of the actors/gamers. As a result, new ranking can be created of the plurality of actors using the replaced parameter values.

Furthermore, embodiments of the disclosure may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the disclosure are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present disclosure are apparent from the examples of embodiments to be described hereinafter and are explained with reference to the examples of embodiments, to which the disclosure is not limited.

Preferred embodiments of the disclosure will be described, by way of example only, and with reference to the following drawings.

DETAILED DESCRIPTION

In the context of this description, the following conventions, terms and/or expressions may be used:

The term 'detecting a change' can refer to framing variables, their value constraints or edge conditions that have a detectable change in a meta-environment. Furthermore, the 'detecting a change' can include an actor may getting a new ability, represented by a new parameter, which may lead to a collection of data for this additional parameter.

The term 'meta-environment' refers to a meta-verse, meta-universe or a virtual reality in which artificial actors—e.g., avatars—interact with each other and the framing conditions of the meta-verse. The rules and the framing conditions may be definable by a set of parameters and/or parameter values.

The term 'historic parameter values' refers to measurable data relating to the abstract variable 'parameter'. The adjective 'historic' describes the collected data relating to the parameter generated during interactions of an actor in the meta-environment up to a current point in time. For instance, if the meta-environment is a computer game, the parameter describing a new ability of an actor can be related to a new weapon being available to the actor in the game. This can represent a fundamental change in the way the actors interact with each other because one of the actors now can have a new feature/ability/weapon giving him an advantage/disadvantage over the others.

The term 'actor' refers to a figure or character in the meta-environment having a set of abilities represented by a corresponding set of parameters. Over time (e.g., during a match) the abilities can change. If the meta-environment describes the virtual space in which a real robot interacts with its environment, the change in abilities can be reached by changing a handling tool at the end of the robot arm.

The term 'ability' refers to a characteristic of the actor defined by a related parameter.

The term 'current parameter value' refers to a data value measured during an interaction of the actor with its environment and relating to the ability represented by the corresponding parameter. It can, for example, be the strength of a weapon of a character in a computer game, the number of hits with the weapon or, a volume of paint that a painting robot is be able to spray per minute.

The term 'weight value' refers to the importance of another variable, like, the parameter. As a consequence, the measured or parameter values can be multiplied by the respective weight well used in order to determine actual usable ability of the actor.

The term 'function' refers to mathematical expression yielding a result value of the function based on a set of variable values as input. The result can be generated by a computer-supported calculation or using look-up tables.

The term 'new parameter' refers to or represents a new ability of an actor. Based on the new parameter, a new parameter values may be collected.

The term 'game' refers to a computer game using a virtual reality with actors interacting with the virtual reality or with each other.

The term 'ranking' refers to a sequence of identifiers of actors or—in a 1:1 relationship between actors and gamers in the described context—of gamers describing probabilities of chances to win. In other words, a ranking can be a relationship between a set of items such that, for any two items, the first is either "ranked higher than", "ranked lower than" or "ranked equal to" the second. In mathematics, this is known as a weak order or total preorder of objects. It is not necessarily a total order of objects because two different objects can have the same ranking. The rankings themselves are totally ordered. For example, materials are totally pre-ordered by hardness, while degrees of hardness are totally ordered. If two items are the same in rank, it is considered a tie.

The term 'statistical analyzer system' refers primarily to denote a deterministic system to analyze a dependency of data on one another, e.g., a regression. However, also a machine-learning system may be used for the task of analyzing collected data.

The term 'trained machine-learning system' refers to a system enabled to output values based on input data. The behavior of the system is initiated by training data to determine, predict or forecast output values based on run-time input data. Generally, 'machine-learning' is seen as a part of artificial intelligence. Machine-learning algorithms may build a machine-learning model based on sample data, known as "training data", in order to make predictions or decisions without being explicitly programmed to do so—i.e., a non-procedural system.

The term 'first new parameter values' refers to a first set of artificially or synthetically determined parameter value. Other sets of generated parameter values may also exist.

In the following, a detailed description of the figures will be given. All instructions in the figures are schematic. Firstly, a block diagram of an embodiment of the inventive computer-implemented method for detecting a change in a meta-environment is given. Afterwards, further embodiments, as well as embodiments of the meta-environment change detection system for detecting a change in a meta-environment will be described.

Figure 1:
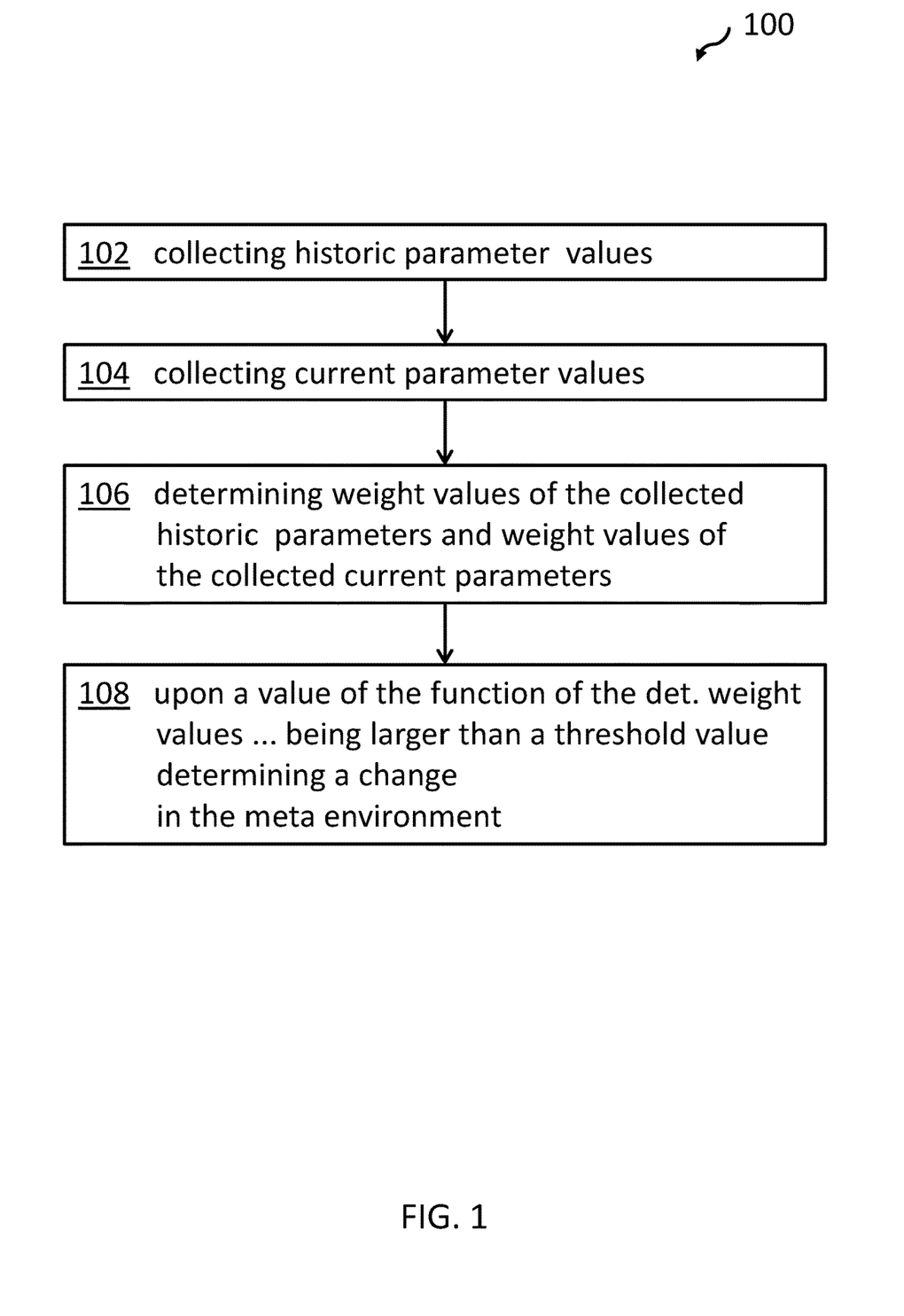
FIG. 1 shows a block diagram of an embodiment of the inventive computer-implemented method for detecting a change in a meta-environment.

FIG. 1 illustrates a block diagram of a preferred embodiment of the computer-implemented method 100 for detecting a change in a meta-environment (e.g., a virtual reality world for e-sports, a real sports match or, a real physical robot environment). The underlying ruleset determines the complete mechanics of the game, but also statistics associated with actors, i.e., players of the game, e.g. use of game tools/attacks, etc. or, in the real world, the boundary conditions of the movements of a robot. The method 100 includes collecting, 102, historic parameter values (e.g., a concrete number of points achieved with the ability corresponding to the parameter or, real match points in a sports event, etc.) from at least one actor being active in the meta-environment. Thereby, the at least one actors has a set of abilities represented by parameters relating to the collected parameter values.

The method 100 also includes collecting, 104, current parameter values, from the at least one actor being active in the meta-environment. Thereby, the underlying parameters may differ from those at the time the historic parameter values were collection of.

Additionally, the method 100 determining, 106, weight values of the collected historic parameters and weight values of the collected current parameters. This may be done by a classical forecasting system, e.g., a deterministic statistical system or using a more modern approach, e.g., a machine-learning system trained as a forecasting (e.g., regression) system.

Furthermore, the method 100 includes determining. 108, a recognition of the change in the meta-environment when a value of a function (e.g., the length of a vector of variables) of the determined weight values of the historic parameters and the weight values of the collected current parameters are greater than a predefined threshold value. This can include also the reflection of a new ability or skill of the actor represented by an additional parameter.

Figure 2:
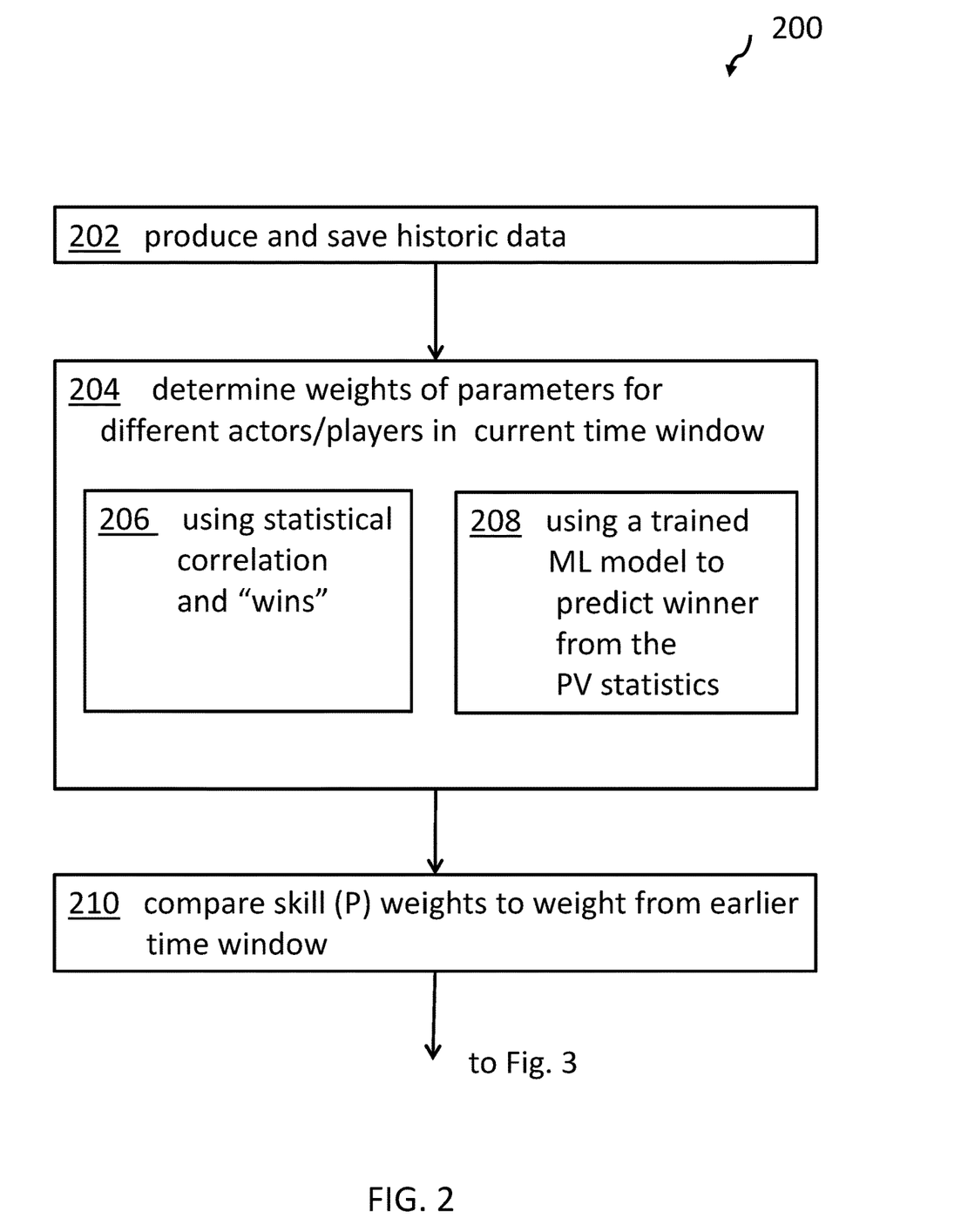
FIG. 2 shows a block diagram of a first part of a flow chart for an embodiment of a meta-change detection and ranking.

FIG. 2 shows a block diagram of a first part 200 of a flow chart for an embodiment of a meta-change detection and ranking. During activities in the meta-environment, all kinds of statistical data about developments in the meta-environment may be produced, collected, and saved, 202, for further use. This applies also to data relating to the parameters, parameter values, respectively, in order to track movements and actions of the actors.

Weights of parameters are determined, 204, for different actors/players in a current time window. This can be achieved by using different technical approaches. For example, these approaches include by using statistical correlations between abilities of actors and match wins determined in a classical non-AI-based manner (e.g., using a statistical regression system) and using a trained machine-learning model to predict a winner from the collected ability data. In step 210, determined weight values for a current time window are compared to weight values from earlier time windows. The flowchart is continued with FIG. 3.

Figure 3:
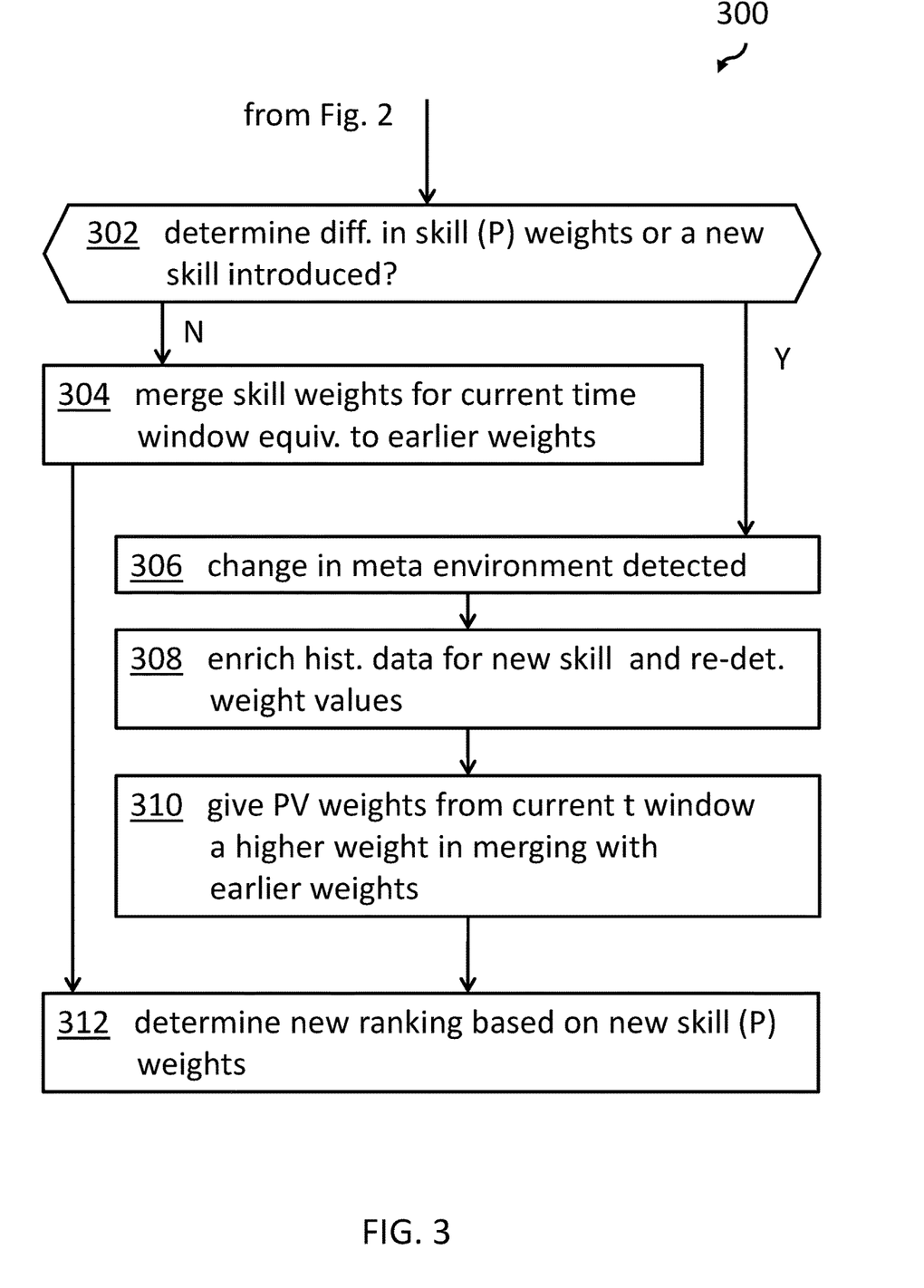
FIG. 3 shows a block diagram of a second part of the flow chart for an embodiment of a meta change detection and ranking.

Continuing the flowchart of FIG. 2, FIG. 3 shows a block diagram of a second part 300 of the flow chart for an embodiment of a meta-change detection (i.e., a change in the meta-environment) and ranking. In this step, a determination 302 is made whether there is a difference in skills (i.e., parameters) and weights that have arisen or where a new skill/ability, or a general rule change, has been introduced in the meta-environment.

If that is not the case—"N"—the process flow continues with merging, 304, the skill of parameter weights for a current time window equivalent to earlier weight values.

If the determination 302 has a positive outcome—case "Y"—a change in the meta-environment is detected, 306. Based on this, the collected historic data (i.e., the collected historic parameter values) are enriched, 308, with new parameter values and a redetermination of the weight values is performed. In step 310, the parameter values (PV) from a current time window are given higher weight values when merging with earlier weight values. This gives the currently measured data, which may only be a few if compared to the rich set of historic statistical data, a higher importance. Additionally, a new ranking is determined, 312, based on the new skill weight values (i.e., the new determined parameter values).

Figure 4:
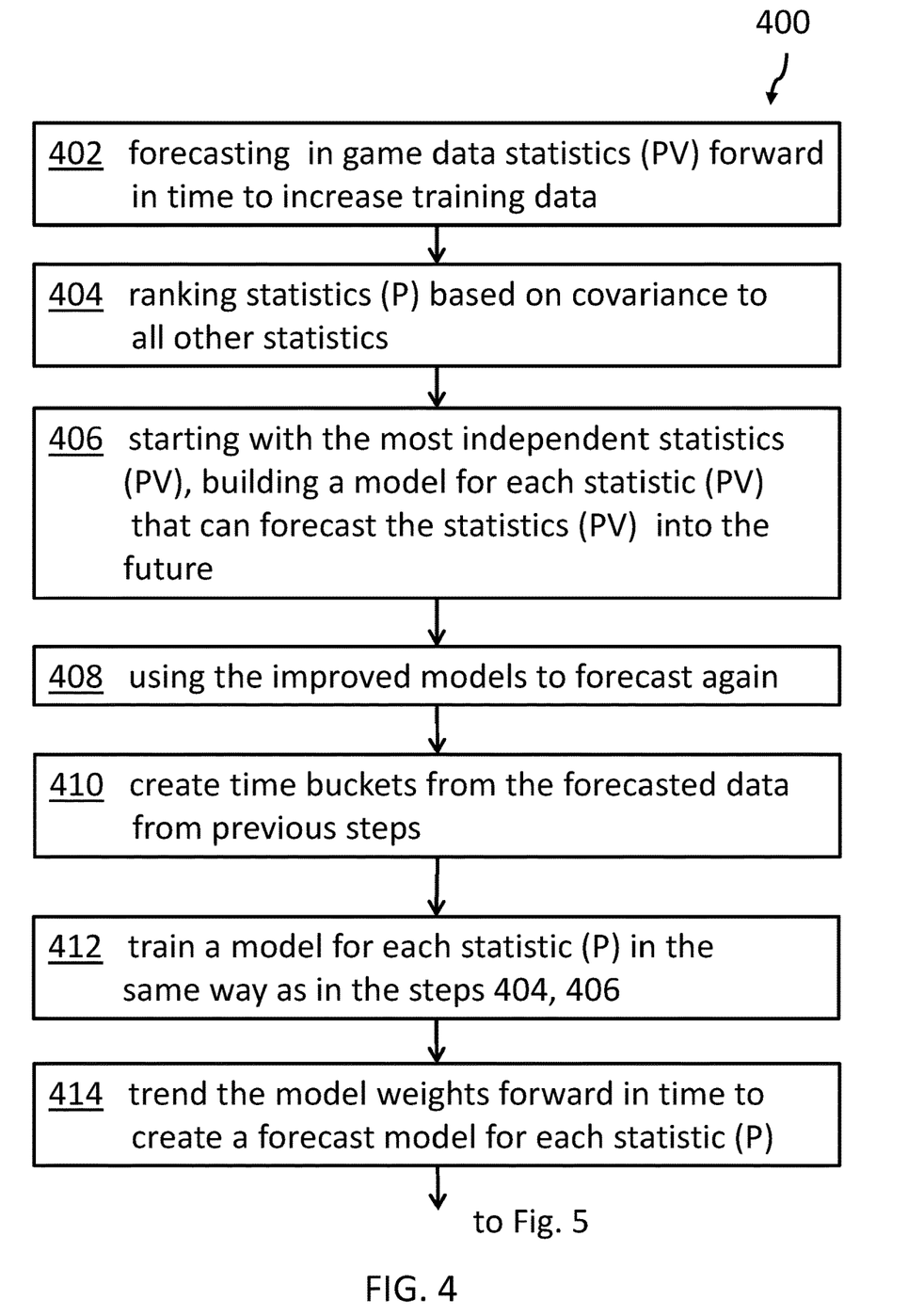
FIG. 4 shows a block diagram of a first part of a flow chart for historic data enrichment.

FIG. 4 shows a block diagram of a first part 400 of a flow chart for historic data enrichment. This figure as well as the next figure describe in more detail step 308 of FIG. 3. It starts with a forecasting, 402, of in-game data statistics, in particular parameter values, forward in time to increase available training data. Also, a ranking of the parameters P is determined, 404, based on a covariance analysis showing a dependency between the variables (i.e., parameter values) of the statistics collected.

Starting with the most independent statistics (i.e., parameter values) a model for each parameter value is built/determined, 406, that is able to forecast these statistics—i.e., the parameter values—into the future. The derived forecasting models are used, 408, to forecast parameter values again. It follows the creation, 410, of time buckets from the at the pre-assessing steps 402 to 406. Next, one model for each of the parameters is built, 412, in the same way as performed in the steps 404, 406. As a next step, for each statistic (i.e., each parameter) a forward-looking model for the weight values in time is built 414 in order to forecast how the weights of the models developed over time. The flowchart continues as in FIG. 5 described.

Figure 5:
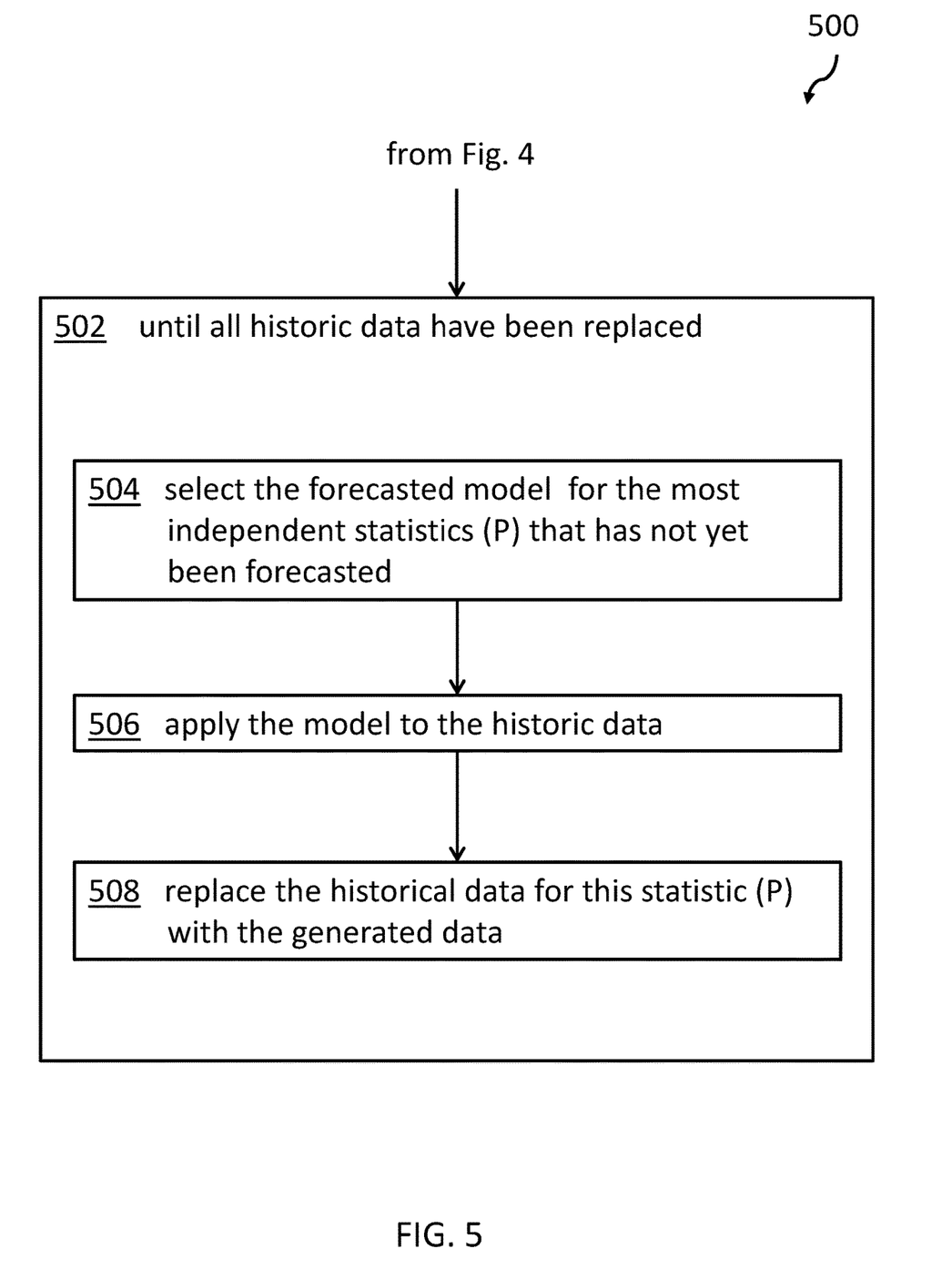
FIG. 5 shows a block diagram of a second part of the flow chart for historic data enrichment.

FIG. 5 shows a block diagram of a second part 500 of the flow chart for historic data enrichment. Using a loop construct "until all historic data has been replaced", 502, new parameter values (i.e., statistics) are created. For that, a forecasting model of the models is selected, 504, which has been trained on the most independent statistics/parameters which have not yet been forecasted. This model is applied to the historic data, 506, and the collected historic data (i.e., the collected historic parameter values_are replaced, 508 in a step-by-step process for the statistic in question (i.e., the parameter) with the newly generated data.

Figure 6:
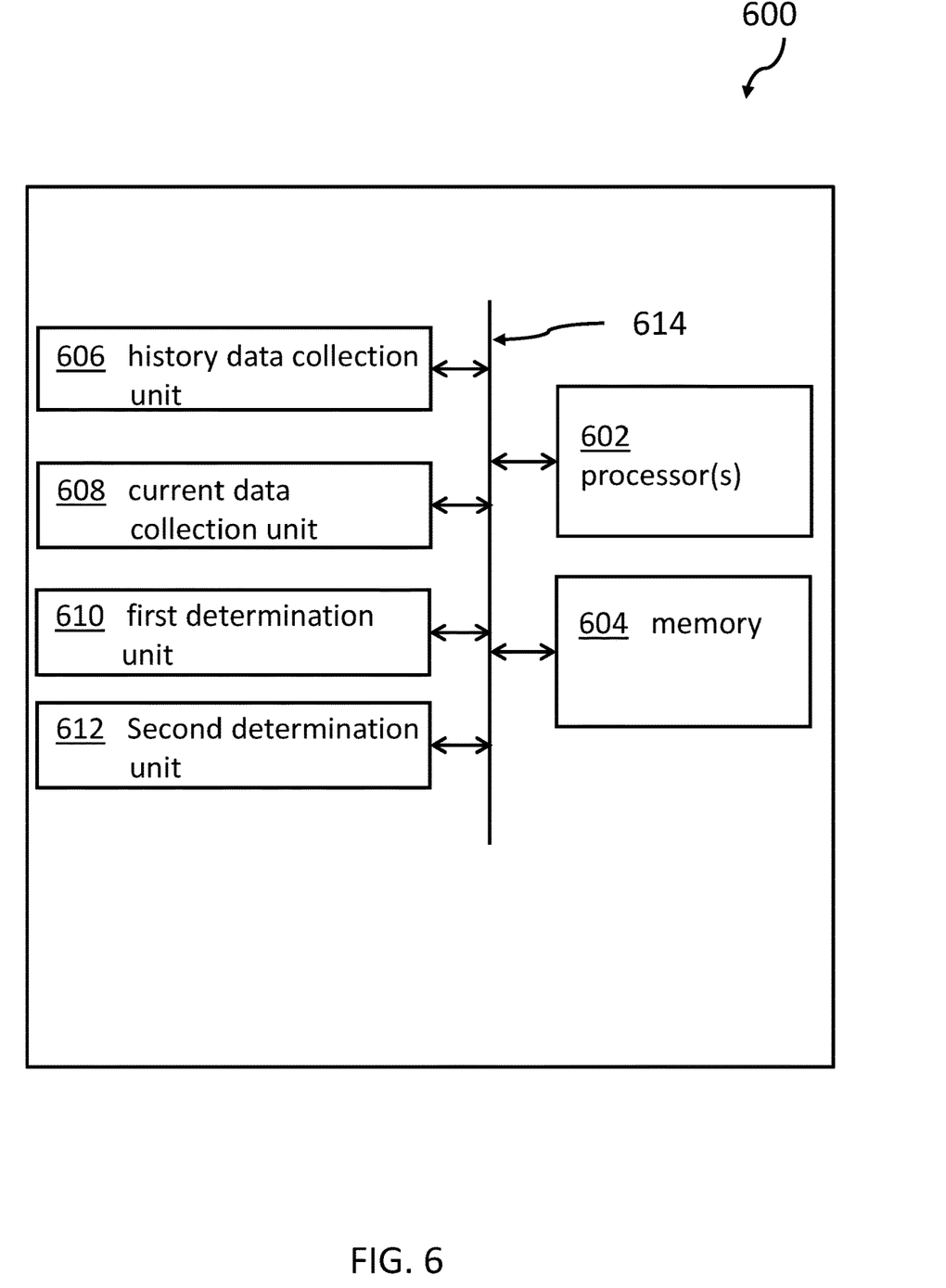
FIG. 6 shows a block diagram of an embodiment of the inventive meta-environment change detection system for detecting a change in a meta-environment.

FIG. 6 shows a block diagram of an embodiment of the meta-environment change detection system 600 for detecting a change in a meta-environment. The system 600 includes a processor 602 and a memory 604, communicatively coupled to the processor 602, wherein the memory 604 stores program code portions that, when executed, enable the processor 602, to collect historic parameter values—in particular, by a history data collection unit 606—from at least one actor being active in the meta-environment, wherein each of the at least one actors has a set of abilities represented by parameters relating to the collected parameter values and, to collect current parameter values—in particular, from a current data collection unit 608—from the at least one actor being active in the meta-environment.

The processor 602 of the system 600 is additionally enabled to determine—in particular by a first determination unit 610—weight values of the collected historic parameters and weight values of the collected current parameters and upon a value of a function of the determined weight values of the historic parameters and the weight values of the collected current parameters being larger than a predefined threshold value, to determine—in particular by a second determination unit 612—a detection of the change in the meta-environment.

It shall also be mentioned that all functional units, modules and functional blocks—in particular, the processor 602, the memory 604, the history data collection unit 606, the current data collection unit 608, the first determination unit 610 and the second determination unit 612—may be communicatively coupled to each other for signal or message exchange in a selected 1:1 manner. Alternatively the functional units, modules and functional blocks can be linked to a system internal bus system 614 for a selective data, signal or message exchange.

Figure 7:
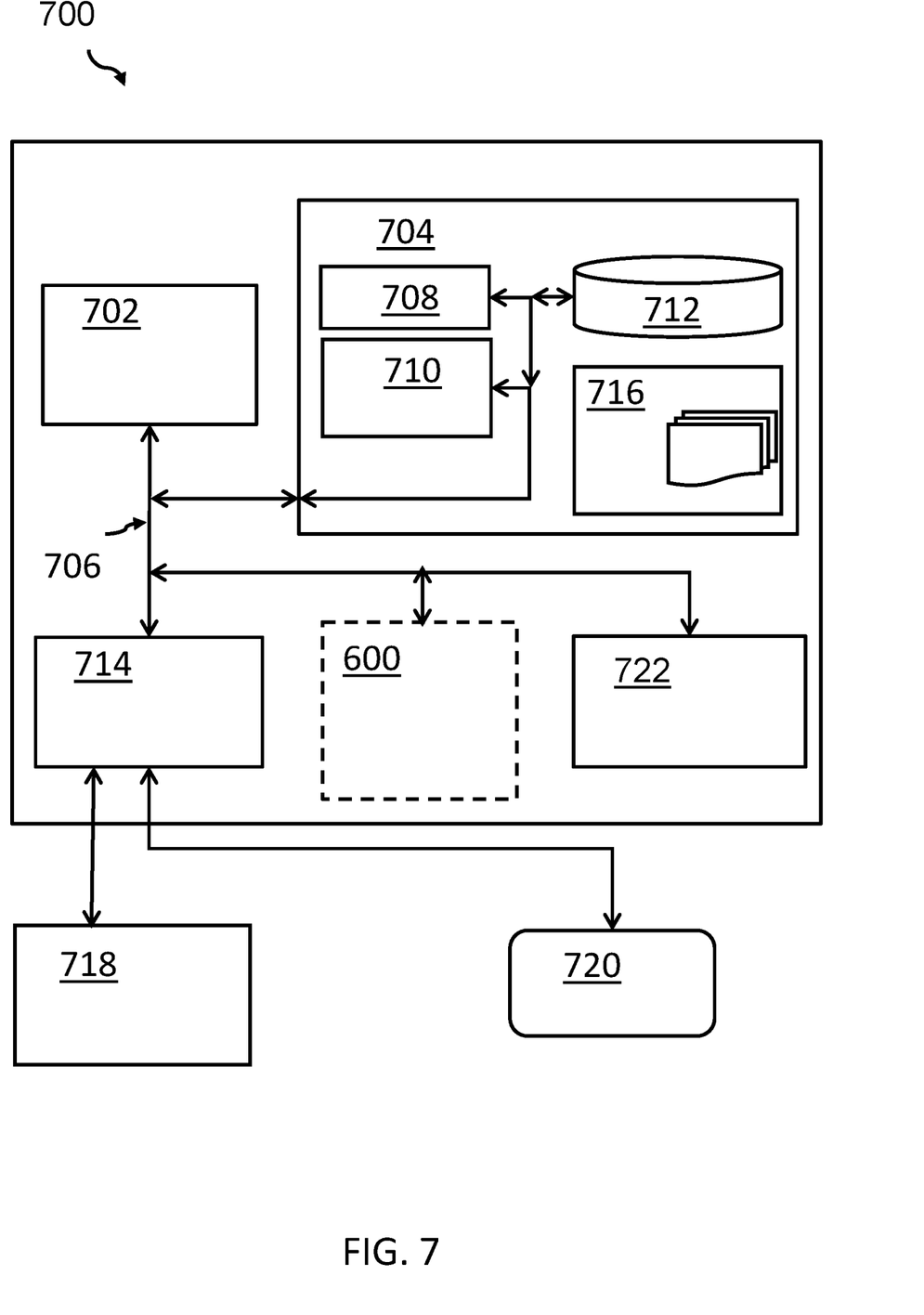
FIG. 7 shows an embodiment of a computing system comprising the system according to FIG. 5.

Embodiments of the disclosure may be implemented together with virtually any type of computer, regardless of the platform being suitable for storing and/or executing program code. FIG. 7 shows, as an example, a computing system 700 suitable for executing program code related to the proposed method.

The computing system 700 is only one example of a suitable computer system, and is not intended to suggest any limitation as to the scope of use or functionality of embodiments of the disclosure described herein, regardless, whether the computer system 700 is capable of being implemented and/or performing any of the functionality set forth hereinabove. In the computer system 700, there are components, which are operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 700 is shown in the form of a general-purpose computing device. The components of computer system/server 700 may include, but are not limited to, one or more processors or processing units 702, a system memory 704, and a bus 706 that couple various system components including system memory 704 to the processor 702. Bus 706 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 700 typically includes a variety of computer system readable media. Such media may be any available media that is accessible by computer system/server 700, and it includes both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 706 by one or more data media interfaces. As will be further depicted and described below, memory 704 may include at least one program product having a set (e.g., at least one) of program modules that are configured to carry out the functions of embodiments of the disclosure.

The program/utility, having a set (at least one) of program modules 716, may be stored in memory 704 by way of example, and not limiting, as well as an operating system, one or more application programs, other program modules, and program data. Each of the operating systems, one or more application programs, other program modules, and program data or some combination thereof, may include an implementation of a networking environment. Program modules 716 generally carry out the functions and/or methodologies of embodiments of the disclosure, as described herein.

The computer system/server 700 may also communicate with one or more external devices 718 such as a keyboard, a pointing device, a display 720, etc.; one or more devices that enable a user to interact with computer system/server 700; and/or any devices (e.g., network card, modem, etc.) that enable computer system/server 700 to communicate with one or more other computing devices. Such communication can occur via Input/Output (I/O) interfaces 714. Still yet, computer system/server 700 may communicate with one or more networks such as a local area network (LAN), a general wide area network (WAN), and/or a public network (e.g., the Internet) via network adapter 722. As depicted, network adapter 722 may communicate with the other components of the computer system/server 700 via bus 706. It should be understood that, although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the meta-environment change detection system 600 for detecting a change in a meta-environment may be attached to the bus system 706.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure may be embodied as a system, a method, and/or a computer program product. The computer program product may include a computer readable storage medium (or media) having computer readable program instructions thereon for causing a processor to carry out aspects of the present disclosure.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state—setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the disclosure. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to best explain the principles of the disclosure and the practical application, and to enable others of ordinary skills in the art to understand the disclosure for various embodiments with various modifications, as are suited to the particular use contemplated.

The inventive concept may be summarized by the following clauses:

1. A computer-implemented method for detecting a change in a meta-environment, the method comprising
    collecting historic parameter values from at least one actor being active in the meta-environment, wherein each of the at least one actors has a set of abilities represented by parameters relating to the collected parameter values,
    collecting current parameter values from the at least one actor being active in the meta-environment,
    determining weight values of the collected historic parameters and weight values of the collected current parameters,
    upon a value of a function of the determined weight values of the historic parameters and the weight values of the collected current parameters being larger than a predefined threshold value, determining a detection of the change in the meta-environment.

2. The method according to clause 1, wherein the determining a detection of the change in the meta-environment also comprises
    detecting a new parameter, wherein the new parameter is indicative of a new ability of at least one of the at least one actors.

3. The method according to clause 1 or 2,
    wherein the meta-environment is a game, and
    wherein the collected historic and/or current parameter values are used to determine a ranking of the actors in the game.

4. The method according to any of the preceding clauses, wherein a function of the weight values of the parameters of the at least one actor represent a total ability of the at least one actor in the meta-environment.

5. The method according to any of the preceding clauses, wherein the determining the weight values comprises
    feeding the historic parameter values and the current parameter values and total ability values to a statistical analyzer system for determining the weight values, or
    feeding the historic parameters values and the current parameter values and respective total ability values to a trained machine-learning system comprising a trained machine-learning model for determining the weight values as prediction values of the machine-learning system, wherein the trained machine-learning model has been built by training of the machine-learning system with historic parameter values and related total ability values.

6. The method according to any of the preceding clauses, wherein a first amount of the historical parameters values is greater than a second amount of current parameter values.

7. The method according to any of the preceding clauses, also comprising
    generating first new parameter values using the current parameter values, and
    imputing the new parameter values into the historical parameter values.

8. The method according to clause 7, wherein the generating first new parameter values using the current parameter values comprises
    extrapolating the current parameter values into the future as first extrapolated parameter values, and
    building a ranking of the parameters a covariance dependency of the extrapolated parameter values.

9. The method according to clause 8, also comprising
    forecasting second parameter values for the parameter with the least covariance value to other parameters using the first extrapolated parameter values.

10. The method according to clause 9, also comprising
    building time buckets for the extrapolated first and second parameter values,
    training forecasting models for third parameter values for the parameters with a next least covariance value to other parameters using the first and second extrapolated parameter values,
    using the trained forecasting models having each a set of variable values built during the steps of training the forecasting models, and
    building sets of variable values for each of the forecasting models, wherein the sets of variable values represent statuses of the forecasting models at a later point in time.

11. The method according to clause 10, also comprising
    using the forecasting models to generate the new parameter values wherein the imputing the new parameter values comprises replacing all collected historical parameter values by newly forecasted parameter values.

12. The method according to clause 11, also comprising
create new ranking of the plurality of actors using the replaced parameter values.

13. A meta-environment change detection system for detecting a change in a meta-environment, the system comprising
a processor and a memory, communicatively coupled to the processor, wherein the memory stores program code portions that, when executed, enable the processor, to
collect historic parameter values from at least one actor being active in the meta-environment, wherein each of the at least one actors has a set of abilities represented by parameters relating to the collected parameter values,
collect current parameter values from the at least one actor being active in the meta-environment,
determine weight values of the collected historic parameters and weight values of the collected current parameters,
upon a value of a function of the determined weight values of the historic parameters and the weight values of the collected current parameters being larger than a predefined threshold value, determine a detection of the change in the meta-environment.

14. The system according to clause 13, wherein the processor during the determining a detection of the change in the meta-environment is also enabled to
detecting a new parameter, wherein the new parameter is indicative of a new ability of at least one of the at least one actors.

15. The system according to clause 13 or 14,
wherein the meta-environment is a game, and the processor is also enabled to determine a ranking of the actors in the game using the collected historic and/or current parameter values.

16. The system according to any of the clauses 13 to 15, wherein a function of the weight values of the parameters of the at least one actor represent a total ability of the at least one actor in the meta-environment.

17. The system according to any of the clauses 13 to 16, wherein the processor is enabled when determining the weight values to
feed the historic parameter values and the current parameter values and total ability values to a statistical analyzer system for determining the weight values, or
feed the historic parameters values and the current parameter values and respective total ability values to a trained machine-learning system comprising a trained machine-learning model for determining the weight values as prediction values of the machine-learning system, wherein the trained machine-learning model has been built by training of the machine-learning system with historic parameter values and related total ability values.

18. The system according to any of the clauses 13 to 17, wherein a first amount of the historical parameter values is larger than a second amount of current parameter values.

19. The system according any of the clauses 13 to 18, wherein the processor is also enabled to
generate first new parameter values using the current parameter values, and to
impute the new parameter values into the historical parameter values.

20. A computer program product for detecting a change in a meta-environment, the computer program product comprising a computer readable storage medium having program instructions embodied therewith, the program instructions being executable by one or more computing systems or controllers to cause the one or more computing systems to
collect historic parameter values from at least one actor being active in the meta-environment, wherein each of the at least one actors has a set of abilities represented by parameters relating to the collected parameter values,
collect current parameter values from the at least one actor being active in the meta-environment,
determine weight values of the collected historic parameters and weight values of the collected current parameters,
upon a value of a function of the determined weight values of the historic parameters and the weight values of the collected current parameters being larger than a predefined threshold value, determine a detection of the change in the meta-environment.

What is claimed is:
1. A computer-implemented method for detecting a change in a meta-environment, the method comprising:
collecting historic parameter values from at least one actor being active in the meta-environment, wherein each of the at least one actor has a set of abilities represented by parameters relating to the collected historic parameter values;
collecting current parameter values from the at least one actor being active in the meta-environment;
determining weight values of the collected historic parameter values and weight values of the collected current parameter values;
determining a detection of the change in the meta-environment upon determining a value of a function of the determined weight values of the collected historic parameter values and the weight values of the collected current parameter values being larger than a predefined threshold value;
generating first new parameter values using the collected current parameter values, wherein the generating the first new parameter values using the collected current parameter values comprises:
extrapolating the collected current parameter values into the future as first extrapolated parameter values; and
building a ranking of the first new parameter values associated with the at least one actor by a covariance dependency value of the first extrapolated parameter values;
imputing the first new parameter values into the collected historic parameter values, wherein the imputing the first new parameter values includes replacing the collected historic parameter values with newly forecasted parameter values;
forecasting second extrapolated parameter values for a parameter of the parameters relating to the collected historic parameter values with the least covariance dependency value to other parameters using the first extrapolated parameter values;
building time buckets for the first extrapolated parameter values and the second extrapolated parameter values;
training forecasting models for third parameter values for the parameters relating to the collected historic parameter values with a next least covariance dependency value to other parameters, using the first extrapolated parameter values and the second extrapolated parameter values;

building a set of variable values for each of the trained forecasting models;
using the set of variable values for each of the trained forecasting models that represent statuses of the trained forecasting models at a later point in time; and
using the trained forecasting models to generate the first new parameter values.

2. The method according to claim 1, wherein the determining the detection of the change in the meta-environment comprises detecting a new parameter, wherein the new parameter indicates a new ability of at least one of the at least one actor.

3. The method according to claim 1, wherein the meta-environment is a game, the at least one actor includes at least two actors, and the collected historic parameter values and the collected current parameter values are used to determine a ranking of the at least two actors in the game.

4. The method according to claim 1, wherein the function of the determined weight values of the collected historic parameter values and the weight values of the collected current parameter values of the at least one actor represents a total ability of the at least one actor in the meta-environment.

5. The method according to claim 1, wherein the determining the weight values of the collected historic parameter values and the weight values of the collected current parameter values comprises:
feeding the collected historic parameter values and the collected current parameter values and total ability values to a statistical analyzer system for the determining the weight values of the collected historic parameter values and the weight values of the collected current parameter values.

6. The method according to claim 1, wherein an amount of the collected historic parameter values is greater than an amount of the collected current parameter values.

7. The method according to claim 1, further comprising:
creating a new ranking of the first extrapolated parameter values using the newly forecasted parameter values.

8. A meta-environment change detection system for detecting a change in a meta-environment, the system comprising a processor and a memory, communicatively coupled to the processor, wherein the memory stores program code portions that, when executed, enable the processor to:
collect historic parameter values from at least one actor being active in the meta-environment, wherein each of the at least one actor has a set of abilities represented by parameters relating to the collected historic parameter values;
collect current parameter values from the at least one actor being active in the meta-environment;
determine weight values of the collected historic parameter values and weight values of the collected current parameter values;
determine a detection of the change in the meta-environment upon determining a value of a function of the determined weight values of the collected historic parameter values and the determined weight values of the collected current parameter values being larger than a predefined threshold value;
generate first new parameter values using the collected current parameter values, wherein the generate the first new parameter values using the collected current parameter values comprises:
extrapolating the collected current parameter values into the future as first extrapolated parameter values; and building a ranking of the first new parameter values associated with the at least one actor by a covariance dependency value of the first extrapolated parameter values;
impute the first new parameter values into the collected historic parameter values, wherein the impute the first new parameter values includes replacing the collected historic parameter values with newly forecasted parameter values;
forecast second extrapolated parameter values for a parameter of the parameters relating to the collected historic parameter values with the least covariance dependency value to other parameters using the first extrapolated parameter values;
build time buckets for the first extrapolated parameter values and the second extrapolated parameter values;
train forecasting models for third parameter values for the parameters relating to the collected historic parameter values with a next least covariance dependency value to other parameters, using the first extrapolated parameter values and the second extrapolated parameter values;
build a set of variable values for each of the trained forecasting models;
use the set of variable values for each of the trained forecasting models that represent statuses of the trained forecasting models at a later point in time; and
use the trained forecasting models to generate the first new parameter values.

9. The system according to claim 8, wherein the determine the detection of the change in the meta-environment also enables the processor to:
detect a new parameter, wherein the new parameter is indicative of a new ability of at least one of the at least one actor.

10. The system according to claim 8, wherein the meta-environment is a game, the at least one actor includes at least two actors, and the processor is also enabled to determine a ranking of the at least two actors in the game using the collected historic parameter values and/or the collected current parameter values.

11. The system according to claim 8, wherein the function of the determined weight values of the collected historic parameter values and the collected current parameter values of the at least one actor represents a total ability of the at least one actor in the meta-environment.

12. The system according to claim 8, wherein the processor is enabled when determining the weight values to:
feed the collected historic parameter values and the collected current parameter values and total ability values to a statistical analyzer system for the determining the weight values.

13. The system according to claim 8, wherein an amount of the collected historic parameter values is larger than an amount of the collected current parameter values.

14. A computer program product for detecting a change in a meta-environment, the computer program product comprising a computer readable storage medium having program instructions embodied therewith, the program instructions being executable by one or more computing systems or controllers to cause the one or more computing systems to:
collect historic parameter values from at least one actor being active in the meta-environment, wherein each of the at least one actor has a set of abilities represented by parameters relating to the collected historic parameter values;
collect current parameter values from the at least one actor being active in the meta-environment;

determine weight values of the collected historic parameter values and weight values of the collected current parameter values;
determine a detection of a change in the meta-environment upon determining a value of a function of the determined weight values of the collected historic parameter values and the determined weight values of the collected current parameter values being larger than a predefined threshold value;
generate first new parameter values using the collected current parameter values, wherein the generate the first new parameter values using the collected current parameter values comprises:
   extrapolating the collected current parameter values into the future as first extrapolated parameter values; and
   building a ranking of the first new parameter values associated with the at least one actor by a covariance dependency value of the first extrapolated parameter values;
impute the first new parameter values into the collected historic parameter values, wherein the impute the first new parameter values includes replacing the collected historic parameter values with newly forecasted parameter values;
forecast second extrapolated parameter values for a parameter of the parameters relating to the collected historic parameter values with the least covariance dependency value to other parameters using the first extrapolated parameter values;
build time buckets for the first extrapolated parameter values and the second extrapolated parameter values;
train forecasting models for third parameter values for the parameters relating to the collected historic parameter values with a next least covariance dependency value to other parameters, using the first extrapolated parameter values and the second extrapolated parameter values;
build a set of variable values for each of the trained forecasting models;
use the set of variable values for each of the trained forecasting models that represent statuses of the trained forecasting models at a later point in time; and
use the trained forecasting models to generate the first new parameter values.

\* \* \* \* \*